US009239085B2

(12) United States Patent
Nelson et al.

(10) Patent No.: US 9,239,085 B2
(45) Date of Patent: Jan. 19, 2016

(54) REDUCED PARASITIC HYDRAULIC FAN SYSTEM WITH REVERSING CAPABILITY

(75) Inventors: Bryan Edward Nelson, Lacon, IL (US); Jeremy Todd Peterson, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 607 days.

(21) Appl. No.: 13/566,374

(22) Filed: Aug. 3, 2012

(65) Prior Publication Data
US 2014/0033693 A1   Feb. 6, 2014

(51) Int. Cl.
*E02F 9/22* (2006.01)
*F16D 31/00* (2006.01)

(52) U.S. Cl.
CPC ........................................ *F16D 31/00* (2013.01)

(58) Field of Classification Search
CPC ...................................................... F16D 31/00
USPC ..................................... 60/413, 421, 428, 371
See application file for complete search history.

(56) References Cited

U.S. PATENT DOCUMENTS

| | | | |
|---|---|---|---|
| 4,022,021 A * | 5/1977 | Russell, Jr. ..................... 60/420 |
| 6,311,488 B1 * | 11/2001 | Maruta et al. ................... 60/450 |
| 7,712,309 B2 | 5/2010 | Vigholm |
| 2005/0166587 A1 | 8/2005 | Reiners et al. |
| 2006/0196179 A1 * | 9/2006 | Kesavan et al. ................. 60/413 |
| 2007/0193262 A1 * | 8/2007 | Iwamoto ........................ 60/421 |
| 2008/0223026 A1 * | 9/2008 | Schuh et al. .................... 60/421 |
| 2009/0266072 A1 | 10/2009 | Kuipers et al. |
| 2010/0056326 A1 * | 3/2010 | Kahn et al. ....................... 477/3 |
| 2010/0131158 A1 | 5/2010 | Saito |
| 2010/0303643 A1 * | 12/2010 | Kataoka et al. ............... 417/213 |
| 2011/0011076 A1 * | 1/2011 | Tanaka et al. .................. 60/396 |
| 2011/0146261 A1 | 6/2011 | Tevis et al. |
| 2011/0197576 A1 | 8/2011 | Wada et al. |
| 2012/0060777 A1 * | 3/2012 | Tikkanen et al. .......... 123/41.11 |

* cited by examiner

*Primary Examiner* — Nathaniel Wiehe
*Assistant Examiner* — Dustin T Nguyen
(74) *Attorney, Agent, or Firm* — Miller, Matthias & Hull LLP; Jeff A. Greene (57) ABSTRACT

A method is provided for controlling a hydraulic system having at least an implement pump, a fan-steering-braking (FSB) pump, a valve assembly, a fan drive system and one or more accumulators. The method may determine an operational state of a power source associated with the hydraulic system, actuate one or more valves of the valve assembly such that the FSB pump charges the accumulators and operates at least the fan drive system if the power source is operating at less than maximum power, and actuate one or more valves of the valve assembly such that the accumulators operate at least the fan drive system and such that the FSB pump supplements the implement pump as needed if the power source is operating at maximum power.

17 Claims, 5 Drawing Sheets

REDUCED PARASITIC HYDRAULIC FAN SYSTEM WITH REVERSING CAPABILITY

TECHNICAL FIELD

The present disclosure relates generally to hydraulic machines, and more particularly, to systems and methods of controlling hydraulic fan systems of hydraulic machines.

BACKGROUND

Work machines, such as tractors, backhoe loaders, compactors, feller bunchers, forest machines, industrial loaders, skid steer loaders, wheel loaders, mining vehicles, and the like, often employ hydraulic systems that provide functionality and control to various aspects of the machines. Typically, work machines employ multiple fluid pressurizing pumps to provide hydraulic power to a number of different machine functions, including functions pertaining to implement systems, fan drive systems, steering systems, braking systems, propulsion systems, swing systems, and the like.

Based on design choice, the hydraulic system may be configured such that one or more of the machine functions are individually powered by dedicated pumps while other machine functions are powered by a shared pump. For example, while some machines employ a dedicated fan pump configured to only power the fan drive system, other machines often employ the fan pump to drive not only the fan drive system but also the braking and/or steering system. Although sharing a single pump over multiple machine functions may provide more efficient use of the hydraulic system, it does come with its drawbacks.

The fan drive system of a typical work machine is configured to drive the motor of a cooling fan during operation of the machine, which serves to circulate air through air flow passages situated around the engine and dissipate heat from the engine compartment. When the fan pump is used to power the braking and/or steering systems in addition to the fan drive system, power to the fan drive system is sacrificed at the cost of driving the braking and/or steering systems due to the fixed displacement of the fan motor. This reduction in power to the fan drive system results in reduced output torque of the cooling fan, and thus, a reduction in fan speed. Moreover, reductions in fan speed can lead to substantial reductions in engine cooling, which can adversely affect the overall performance and efficiency of the machine.

In addition to cooling the engine, the fan drive system can also be controlled to periodically reverse the rotation of the cooling fan in order to dislodge any debris from screens of the engine compartment which lead to the air flow passages. More specifically, as the cooling fan urges outside air through the screens and into the air flow passages for cooling the engine during normal machine operation, any debris that may be carried by the air can collect on the screens over time, thus hindering air flow and degrading the cooling capabilities of the fan drive system. Various mechanisms have been conventionally used to provide fan reversibility in industrial work machines. In typical implementations, however, angular momentum causes a residual motion in the rotating fan which has been noted to induce vacuums within the hydraulics of the fan drive system. Such vacuums can introduce cavitation within the hydraulics system which can be detrimental to the machine. Additionally, a sudden change in flow direction through valving can cause damaging pressure spikes.

Accordingly, there is a need to improve the overall performance of hydraulic systems in mobile and work machines and reduce parasitic losses. Moreover, there is a need to provide means for controlling and managing hydraulic systems that are better suited to maintain optimum performance of individual machine functions without sacrificing efficiency. There is also a need for improved reversibility of the fan drive system that is less susceptible to pressure spikes caused by pressure differentials within the hydraulic system.

SUMMARY OF THE DISCLOSURE

In one aspect of the present disclosure, a method is provided for controlling a hydraulic system having at least an implement pump, a fan-steering-braking (FSB) pump, a valve assembly, a fan drive system and one or more accumulators. The method may determine an operational state of a power source associated with the hydraulic system, actuate one or more valves of the valve assembly such that the FSB pump charges the accumulators and operates at least the fan drive system if the power source is operating at less than maximum power, and actuate one or more valves of the valve assembly such that the accumulators operate at least the fan drive system and such that the FSB pump supplements the implement pump as needed if the power source is operating at maximum power.

In a refinement, the operational state of the power source may be determined from feedback provided by one or more sensors associated with the power source.

In another refinement, the hydraulic system may further include an implement system for driving one or more implements. The implement system may be driven by the implement pump.

In a related refinement, the valve assembly may include at least one combiner valve disposed in communication between the implement system and the FSB pump. The combiner valve may be selectively actuated such that the FSB pump supplements the implement pump as needed if the power source is operating at maximum power.

In another refinement, the FSB pump may be placed in standby mode if the power source is operating at less than maximum power.

In another refinement, the hydraulic system may further include a steering system and a braking system, each of which may be driven by the FSB pump if the power source is operating at less than maximum power, and driven by the accumulators if the power source is operating at maximum power.

In yet another refinement, the fan drive system may include an over-center motor configured to operate a cooling fan and a variable displacement piston. The method may further monitor a hydraulic pressure of the fan drive system, and adjust a displacement of the piston to maintain a substantially constant rotational speed of the cooling fan if the hydraulic pressure falls below a predefined threshold.

In accordance with another aspect of the present disclosure, a control system is provided for controlling a hydraulic system having at least an implement pump, a FSB pump, a fan drive system, an implement system and one or more accumulators. The control system may include a valve assembly having one or more actuatable valves disposed in selective communication between each of the implement pump, the FSB pump, the fan drive system, the implement system and the accumulators, and a controller operatively coupled to the valve assembly. The controller may be configured to actuate one or more valves of the valve assembly such that the FSB pump charges the accumulators and operates at least the fan drive system if a power source associated with the hydraulic system is operating at less than maximum power, and actuate one or more valves of the valve assembly such that the accumulators operate at least the fan drive system and such that the FSB pump supplements the implement pump as needed if the power source is operating at maximum power.

In a refinement, the control system may further include at least one sensor operatively coupled to the power source. The sensor may be configured to detect at least one parameter indicative of the operational state of the power source and communicate the parameter to the controller.

In another refinement, the valve assembly may include at least one combiner valve disposed in communication between the FSB pump and the implement system. The controller may be configured to selectively actuate the combiner valve such that the FSB pump supplements the implement pump as needed if the power source is operating at maximum power.

In another refinement, the implement pump may be configured to primarily drive the implement system to operate one or more implements, and the FSB pump may be configured to primarily drive the fan drive system to operate one or more cooling fans.

In another refinement, the controller may be configured to place the FSB pump in standby mode if the power source is operating at less than maximum power.

In another refinement, the hydraulic system may further include a steering system and a braking system, each of which may be driven by the FSB pump if the power source is operating at less than maximum power, and driven by the accumulators if the power source is operating at maximum power.

In yet another refinement, the fan drive system may include an over-center motor configured to operate a cooling fan and a variable displacement piston. The controller may be configured to further monitor a hydraulic pressure of the fan drive system, and adjust a displacement of the piston to maintain a substantially constant rotational speed of the cooling fan if the hydraulic pressure falls below a predefined threshold.

In accordance with yet another aspect of the present disclosure, a hydraulic system for a machine is provided. The hydraulic system may include an implement pump configured to operate an implement system, a FSB pump configured to operate at least a fan drive system having one or more accumulators associated therewith, a valve assembly having one or more actuatable valves disposed in communication between each of the implement pump, the FSB pump, the fan drive system, the implement system and the accumulators, and a controller operatively coupled to the valve assembly. The controller may be configured to actuate one or more valves of the valve assembly such that the FSB pump charges the accumulators and operates at least the fan drive system if a power source associated with the hydraulic system is operating at less than maximum power, and actuate one or more valves of the valve assembly such that the accumulators operate at least the fan drive system and such that the FSB pump supplements the implement pump as needed if the power source is operating at maximum power.

In a refinement, the implement system may be configured to operate one or more implements of the machine, and the fan drive system may be configured to operate one or more cooling fans of the machine.

In another refinement, the hydraulic system may further include at least one sensor operatively coupled to the power source. The sensor may be configured to detect at least one parameter indicative of the operational state of the power source and communicate the parameter to the controller.

In another refinement, the valve assembly may include at least one combiner valve disposed in communication between the FSB pump and the implement system. The controller may be configured to selectively actuate the combiner valve such that the FSB pump supplements the implement pump as needed if the power source is operating at maximum power.

In another refinement, the FSB pump may further be configured to drive a steering system and a braking system of the machine, wherein each of the steering system and the braking system may be driven by the FSB pump if the power source is operating at less than maximum power, and wherein each of the steering system and the braking system may be driven by the accumulators if the power source is operating at maximum power.

In yet another refinement, the fan drive system may include an over-center motor configured to operate a cooling fan and a variable displacement piston. The controller may be configured to further monitor a hydraulic pressure of the fan drive system, and adjust a displacement of the piston to maintain a substantially constant rotational speed of the cooling fan if the hydraulic pressure falls below a predefined threshold.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
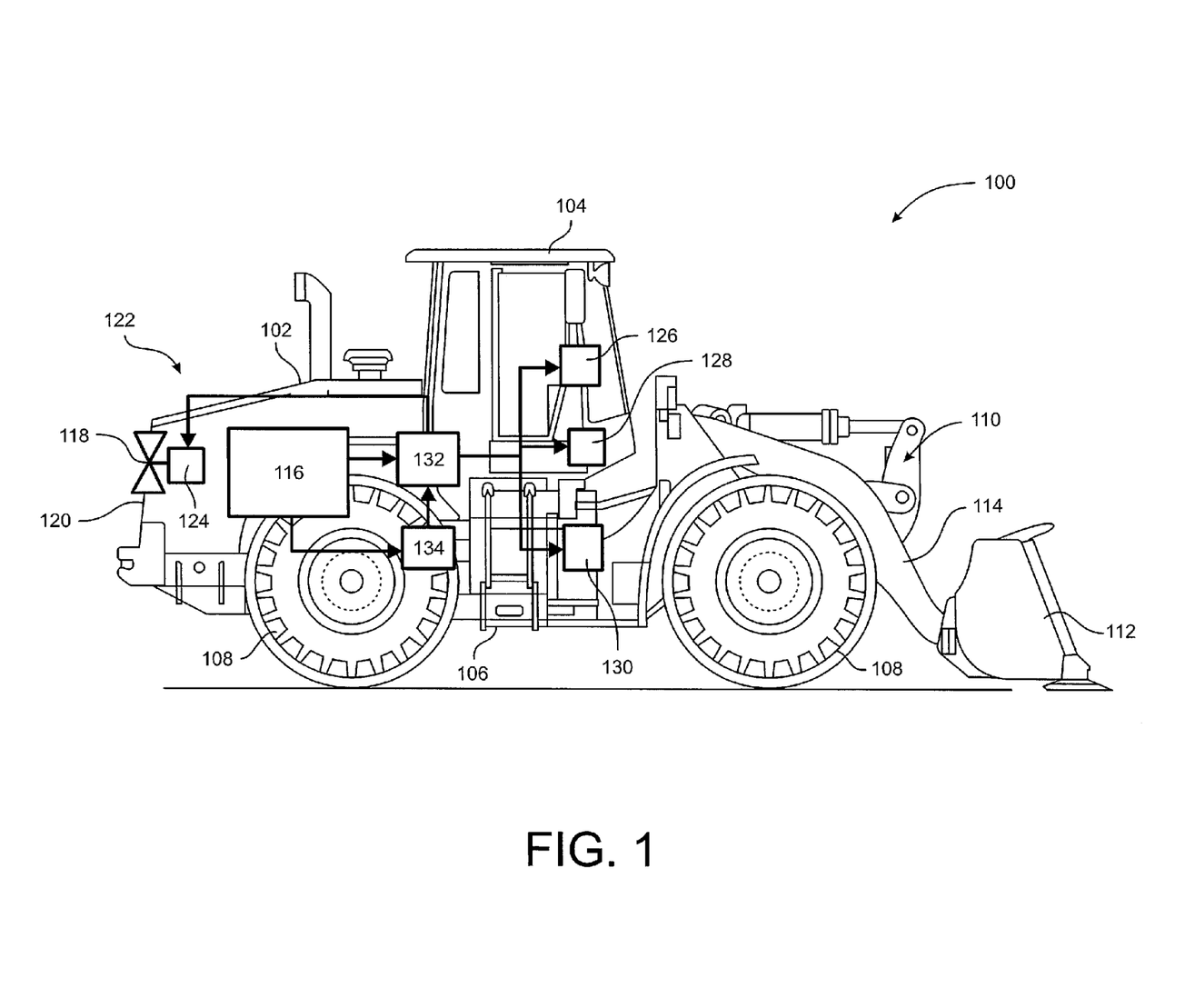
FIG. 1 is a diagrammatic view of one exemplary hydraulic system for a work machine having an implement.

FIG. 1 diagrammatically illustrates a machine 100 that may employ hydraulic means for causing movement and/or operating one or more functions thereof. As shown, the machine 100 may structurally include an engine housing 102 and a cab 104, which may generally be supported by a chassis 106 and caused to be movable by traction devices 108. The machine 100 may also be a mobile work vehicle that is provided with one or more implements 110 thereon. In the articulated wheel loader 100 shown in FIG. 1, for example, the implement 110 may generally include a bucket 112 and associated lift arms 114 that are pivotably movable relative to the chassis 106 by an operator of the machine 100. It will further be understood that other types of work machines may equally if not similarly be applicable to the teachings of the present disclosure without departing from the scope of the appended claims.

Still referring to FIG. 1, the engine housing 102 of the machine 100 may generally form an enclosure or compartment about a power source 116, such as a combustion engine, or the like, and an associated cooling fan 118 mounted therein in a conventional manner. Furthermore, the engine housing 102 may provide an opening 120, which may be screened, through which the cooling fan 118 may draw in and circulate ambient air over or about the engine 116. In other alternatives, the cooling fan 118 may also circulate air through one or more heat exchangers, such as radiators, oil coolers, and the like. Although not shown, the present disclosure may be illustrated in the context of a cooling fan for a variety of coolers, for example, hydraulic oil, transmission oil, intake air, radiator, and the like, associated with an engine and other machine systems, the present disclosure could find potential application to other cooling mechanisms where a hydraulically motored fan may be used to circulate air past some machine component and/or heat exchanger needing cooling air.

As shown in FIG. 1, the machine 100 may include a hydraulic system 122 configured to drive or operate one or more functions associated with the machine 100 and/or one or more implements 110 thereof. For example, the hydraulic system 122 may be configured to supply hydraulic power to one or more of a fan drive system 124 associated with the cooling fan 118, a steering system 126, a braking system 128, as well as an implement system 130 for operating the implement 110 of the machine 100. Specifically, the hydraulic system 122 may include a multi-pump system 132 having a plurality of hydraulic pumps that may be operatively driven by the engine 116 of the machine 100, for instance, through belt-driven mechanisms, chain-driven mechanisms, pulleys, and/or any other mechanism conventionally used in the relevant art. The hydraulic power sourced by the pumps of the multi-pump system 132 may be selectively routed to any one or more of the fan drive system 124, steering system 126, braking system 128 and the implement system 130, among other things, any time during operation of the machine 100. More particularly, the hydraulic system 122 may include a control system 134 with a plurality of actuatable valves that are selectively enabled or operated by a preprogrammed controller of the machine 100.

Figure 2:
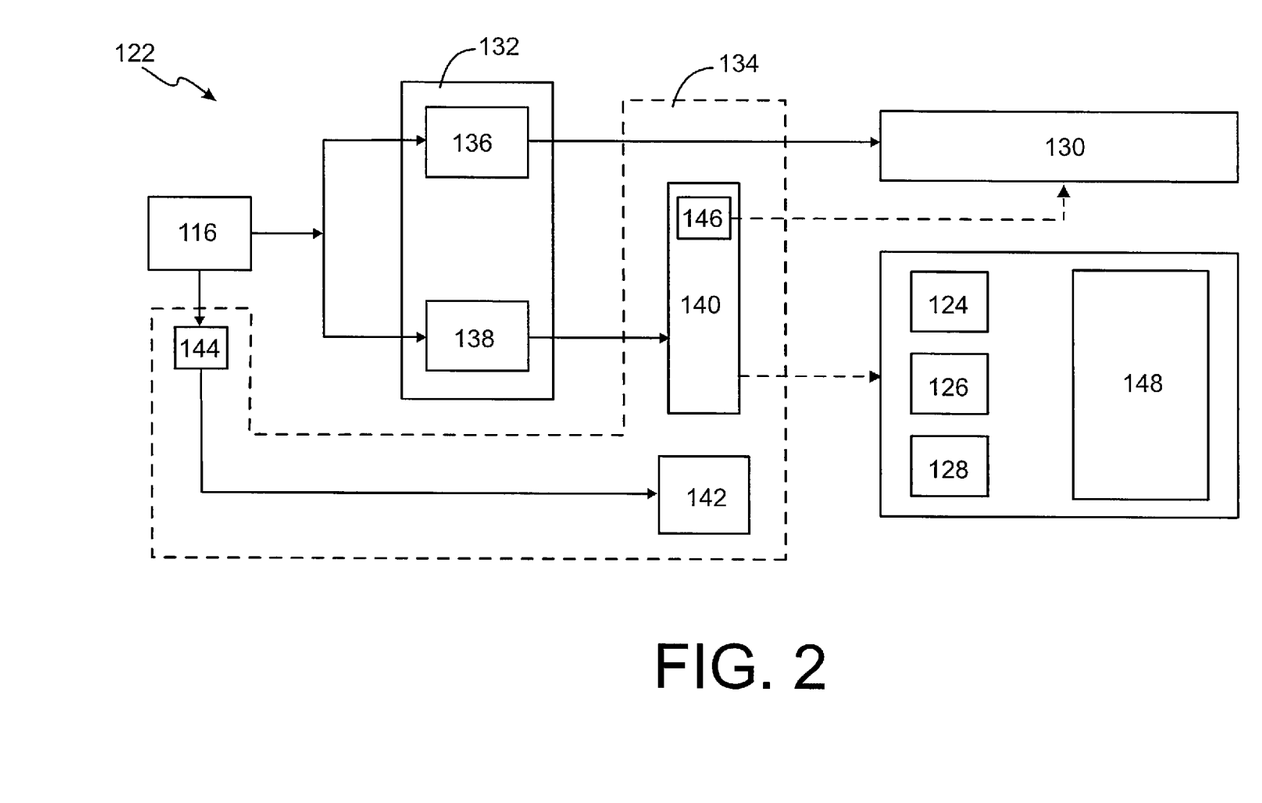
FIG. 2 is a diagrammatic view of another exemplary hydraulic system for a work machine being controlled using a control system.

Turning to FIG. 2, one exemplary embodiment of a hydraulic system 122 for a machine 100 is diagrammatically provided in more detail. As shown, the engine 116 may be in mechanical communication with, and configured to operatively drive, each of a plurality of pumps of the multi-pump system 132. For example, the multi-pump system 132 may include at least a first pump or an implement pump 136 associated with the implement system 130 of the machine 100, as well as a second pump or a fan-steering-braking (FSB) pump 138 associated with each of the fan drive system 124, steering system 126 and braking system 128 of the machine 100. The multi-pump system 132 may also include other additional pumps adapted to supply power to other functions or tools of the machine 100.

As suggested in FIG. 2, the hydraulic power supplied by the multi-pump system 132 may be selectively routed to the various functions of the machine 100 through a network of actuatable valves, or a valve assembly 140, of the associated control system 134. Among other things, the valve assembly 140 may include an actuatable combiner valve 142 configured to selectively enable at least partial hydraulic communication between the FSB pump 138 and the implement system 130 so as to augment the implement pump 136 as needed. The valve assembly 140 may also include valves configured to selectively route hydraulic power sourced by the FSB pump 138 to one or more of the fan drive system 124, the steering system 126 and the braking system 128, or alternatively, to one or more accumulators 144 associated therewith. More specifically, in certain operating conditions, the valve assembly 140 may enable the FSB pump 138 to charge the accumulators 144, while in other operating conditions, the valve assembly 140 may enable the accumulators 144 to discharge and thereby drive one or more of the fan drive system 124, the steering system 126 and the braking system 128.

Such conditional controls of the valve assembly 140 may be provided by the programmable controller 146 of the control system 134 of FIG. 2. Moreover, the controller 146 may electrically control the multi-pump system 134 and/or the valve assembly 140 according to the operational state of the engine 116 and/or the machine 100 as detected by one or more sensors 148 associated therewith. The sensors 148 may include, for instance, variable reluctance sensors, capacitance sensors, Hall-effect sensors, anisotropic magnetoresistance sensors, or any other suitable type of sensor configured to mechanically, electrically, electromagnetically and/or optically communicate operational parameters pertaining to at least the output power of the engine 116 to the controller 146. Thus, based on the sensor feedback, the controller 146 may be able to manipulate the distribution of power within the hydraulic system 122 in a manner which operates the relevant functions of the machine 100 most effectively and efficiently with the given operational state of the machine 100.

Figure 3:
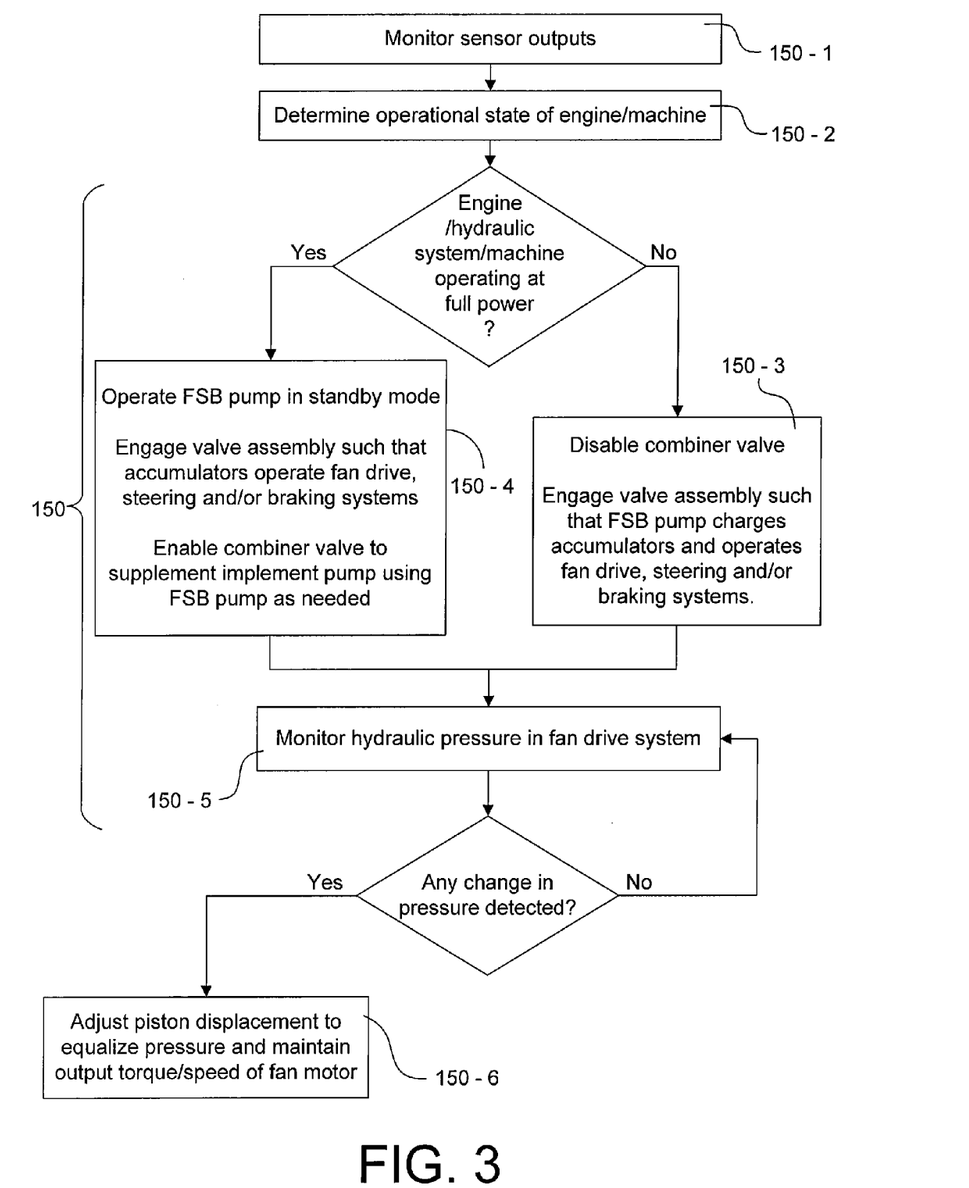
FIG. 3 is a diagrammatic view of one exemplary algorithm or method of controlling a hydraulic system.

Turning now to FIG. 3, a flow diagram of one exemplary algorithm or method 150 by which the controller 146 may be configured to operate the hydraulic system 122 is provided. In accordance with the particular algorithm shown, for example, the controller 146 may be preconfigured to selectively enable or disable one or more actuatable valves of the valve assembly 140 so as to more efficiently distribute hydraulic pressures within the hydraulic system 122 based on the operational state of the engine 116 and/or the machine 100. The controller 146 may be an integrated circuit (IC), or the like, that is configured to operate according to a preprogrammed algorithm or a set of instructions for adjusting various controls of the hydraulic system 122. Such algorithms may be preprogrammed or incorporated into a memory of the controller 146 in the form of executable code or other comparable formats commonly used in the relevant art. More particularly, the controller 146 may be implemented using one or more of an integrated processor, a microprocessor, a microcontroller, an electronic control module (ECM), an electronic control unit (ECU), or any other type of programmable controller capable of providing adequate electronic control of the multi-pump system 132 and/or the valve assembly 140.

As shown in FIG. 3, the controller 146 may be configured to monitor the outputs of one or more sensors 148 associated with at least the engine 116 in step 150-1, and determine the operational state of the engine 116 in step 150-2. For example, the sensors 148 may be configured to detect the operational speed of the engine 116, from which the controller 146 may be able to derive the overall power output, and thus, the general operational state of the engine 116. Furthermore, the controller 146 may be configured to continuously monitor the sensor outputs and/or sample the sensor outputs at predefined intervals throughout the operation of the machine 100. Based on the operational state of the engine 116 determined in step 150-2, the controller 146 may be configured to determine if, for example, the engine 116 is operating at maximum power.

Figure 4:
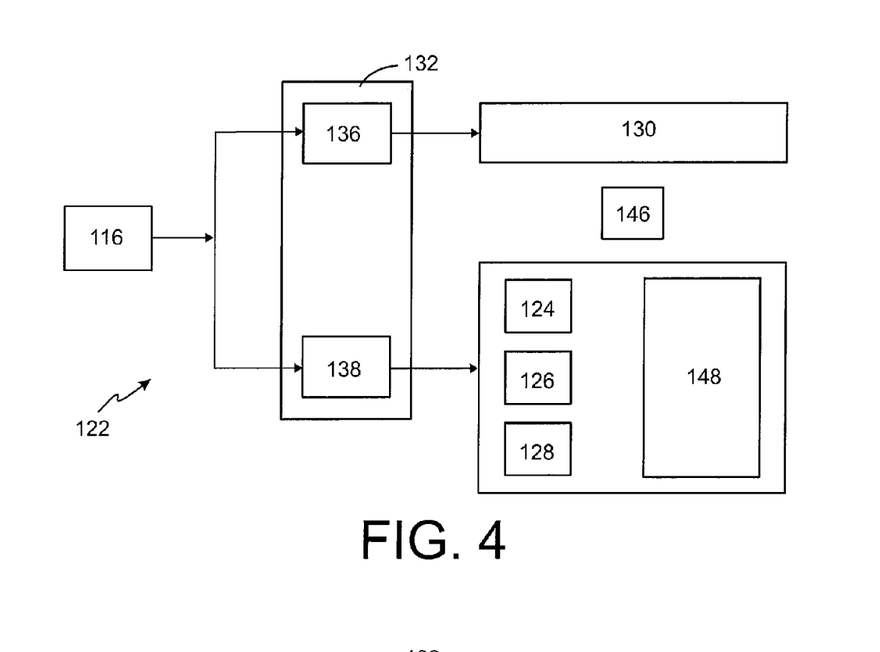
FIG. 4 is a diagrammatic view of the hydraulic system of FIG. 2 being operated in a first mode of operation.

If the engine 116 is operating at less than maximum power, the controller 146 may proceed to control the hydraulic system 122 according to step 150-3. More specifically, as illustrated in FIG. 4, the controller 146 may be configured to disable the combiner valve 142, and engage select valves of the valve assembly 140 so as to enable the FSB pump 138 to charge the accumulators 144 as well as operate the fan drive system 124, the steering system 126 and the braking system 128. As the engine 116 is not operating at maximum power, the FSB pump 138 may be fully capable of sourcing the fan drive system 124, the steering system 126 and the braking system 128 as well as the accumulators 144 associated therewith. Furthermore, operations of the implement system 130 may also be adequately maintained by the implement pump 136 without any supplemental support by the FSB pump 138 while the engine 116 is operating at less than maximum power.

Figure 5:
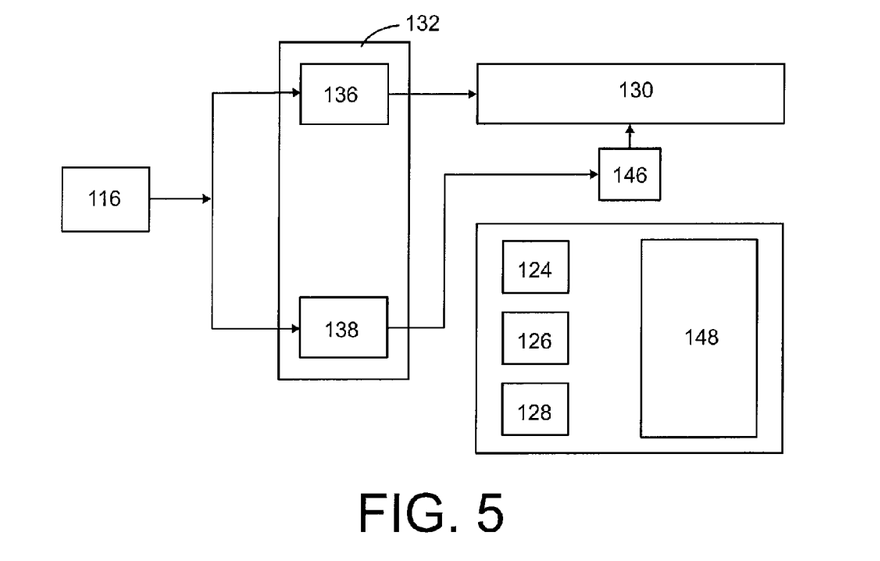
FIG. 5 is a diagrammatic view of the hydraulic system of FIG. 2 being operated in a second mode of operation.

Alternatively, if the engine 116 is operating at maximum power, the controller 146 may proceed to control the hydraulic system 122 according to step 150-4 of FIG. 3. As illustrated in FIG. 5, for example, the controller 146 may be configured to engage select valves of the valve assembly 140 such that the accumulators 144 operate the fan drive system 124, the steering system 126 and the braking system 128. Moreover, the accumulators 144 may be able to at least temporarily operate the fan drive system 124, the steering system 126 and the braking system 128 using previously stored hydraulic pressures that have been charged by the FSB pump 138, for instance, during step 150-3. By operating various functions of the machine 100 using the accumulators 144, the controller 146 may be able to place the FSB pump 138 into standby mode, or a mode in which the FSB pump 138 is not fully engaged and/or operating solely on accumulator support, to conserve power. During step 150-4, the controller 146 may further be able to selectively engage the combiner valve 142 of the valve assembly 140 in a manner which supplements power to the implement system 130. More specifically, the controller 146 may at least temporarily couple an output of the FSB pump 138 to the output of the implement pump 136 to source more hydraulic pressure to the implement system 130 while the engine 116 is operating at maximum power.

Figure 6:
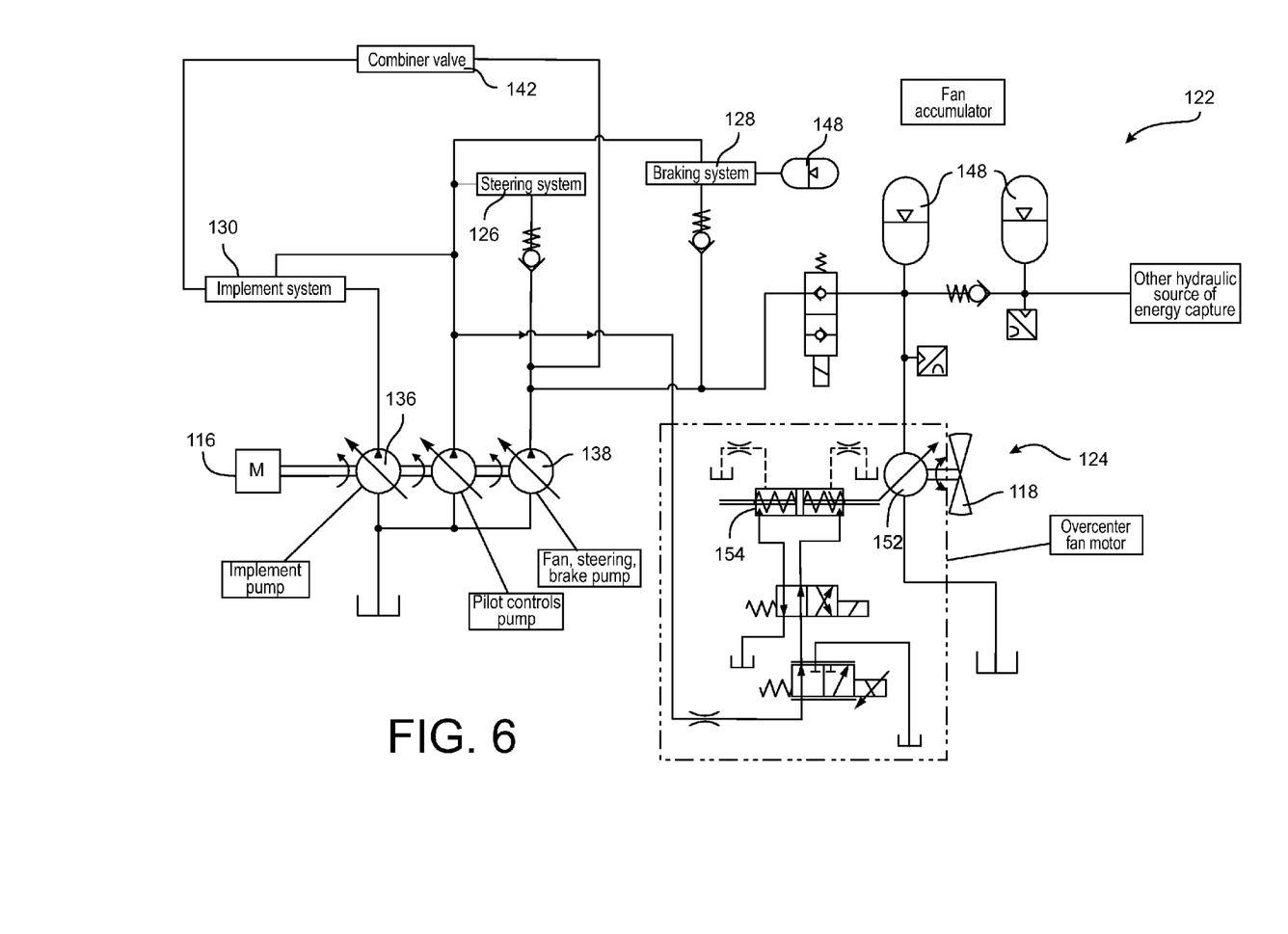
FIG. 6 is a schematic view of another exemplary hydraulic system having a fan drive system with an over-center motor and variable displacement piston.

In still further modifications, the fan drive system 124 of the hydraulic system 122 may be implemented using an over-center motor 152 for operating the cooling fan 118 and a variable displacement piston 154, as shown for example in FIG. 6. The fan drive system 124 shown may generally serve to facilitate reversing capabilities, as well as to maintain a substantially constant fan speed regardless of deficits in the hydraulic pressure sourced by the FSB pump 138. Specifically, the fan drive system 124 may be variable in displacement and bi-directional so as to facilitate reversals of the flow of hydraulic fluids, and thus, of the direction of the cooling fan 118 upon demand. Moreover, the variable displacement piston 154 may be configured to maintain a substantially constant hydraulic pressure at the over-center motor 152 by varying the displacement thereof.

During normal machine operations, the over-center motor 152 may be primarily operated by hydraulic pressures sourced by the FSB pump 138 and/or the accumulators 144. However, when the FSB pump 138 is used to operate other loads within the hydraulic system 122, the pressure provided to the over-center motor 152 may drop. Such drops in hydraulic pressure may decrease the output torque of the over-center motor 152, and thus, the rotational speed of the cooling fan 118. Moreover, such pressure drops may adversely impact the operating temperature of the engine 116, and further, adversely affect the overall performance and efficiency of the machine 100. Accordingly, the variable displacement piston 154 may be provided in fluid communication between an inlet of the over-center motor 152 and a fluid reservoir, and further, configured to compensate for any deficits in hydraulic pressure by varying the displacement thereof. Furthermore, control of the piston 154 may be enabled through the preprogrammed controller 146 of FIG. 2 for instance.

As shown in the algorithm or method 150 of FIG. 3, for example, in step 150-5, the controller 146 may be configured to monitor a hydraulic pressure of the fan drive system 124, or of the over-center motor 152 in the embodiment of FIG. 6. The controller 146 may monitor the hydraulic pressure using any number of different techniques and/or mechanisms commonly used in the art. For instance, the controller 146 may monitor the rotational speed of the cooling fan 118 and/or the operational speed of the over-center motor 152, which the controller 146 may then correlate to the hydraulic pressure applied thereto. In other alternatives, the controller 146 may also detect the hydraulic pressure directly through pressure sensors (not shown) disposed at the over-center motor 152 or along the hydraulic lines in fluid communication therewith. Once the hydraulic pressure to the fan drive system 124 is assessed, the controller 146 may compare the detected pressure to pressure thresholds preprogrammed therein. If the detected pressure is determined to be within an acceptable range for the operational state of the engine 116 and no substantial deficiency in cooling is determined, the controller 146 may simply return to step 150-5 and continue monitoring the hydraulic pressure to the fan drive system 124. Alternatively, if one or more pressure thresholds are exceeded and fan speed is determined to be substantially reduced, the controller 146 may actuate the piston 154 so as to adjust the displacement thereof and equalize the pressure to the over-center motor 152 in step 150-6. In such a way, the controller 146 may continue to adjust the hydraulic pressure applied to the fan drive system 124 until acceptable or optimum output torque, and thus, fan speed is achieved.

INDUSTRIAL APPLICABILITY

In general, the foregoing disclosure finds utility in various industrial applications, such as the farming, construction and mining industries in providing improved control of hydraulic systems typically used in association with work vehicles and/or machines, such as tractors, backhoe loaders, compactors, feller bunchers, forest machines, industrial loaders, skid steer loaders, wheel loaders, and the like. Moreover, the disclosed systems and methods provide means for controlling and managing hydraulic systems which are better suited to maintain optimum performance of individual machine functions without sacrificing efficiency. Specifically, by electronically actuating combiner valves and enabling the FSB pump to selectively assist the implement pump based on the operational characteristics of the engine, the hydraulic system and/or the overall machine, the present disclosure optimizes control of the implement more efficiently. Furthermore, by implementing the fan drive system with an over-center motor and a variable displacement piston, the present disclosure not only facilitates fan reversal operations, but also helps maintain substantially constant fan speed, and thus, optimum cooling to the engine under any hydraulic loading of the machine.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method for controlling a hydraulic system having at least an implement pump, a fan-steering-braking (FSB) pump, a valve assembly, a fan drive system, a steering system, a braking system and one or more accumulators, the method comprising the steps of:

determining an operational state of a power source associated with the hydraulic system;

actuating one or more valves of the valve assembly such that the FSB pump charges the accumulators and operates at least the fan drive system, the steering system and the braking system if the power source is operating at less than maximum power; and actuating one or more valves of the valve assembly such that the accumulators operate at least the fan drive system, the steering system and the braking system and such that the FSB pump supplements the implement pump as needed if the power source is operating at maximum power.

2. The method of claim 1, wherein the operational state of the power source is determined from feedback provided by one or more sensors associated with the power source.

3. The method of claim 1, wherein the hydraulic system further includes an implement system for driving one or more implements, the implement system being driven by the implement pump.

4. The method of claim 3, wherein the valve assembly includes at least one combiner valve disposed in communication between the implement system and the FSB pump, the combiner valve being selectively actuated such that the FSB pump supplements the implement pump as needed if the power source is operating at maximum power.

5. The method of claim 1, wherein the FSB pump is placed in standby mode if the power source is operating at less than maximum power.

6. The method of claim 1, wherein the fan drive system includes an over-center motor configured to operate a cooling fan and a variable displacement piston, the method further comprising the steps of monitoring a hydraulic pressure of the fan drive system, and adjusting a displacement of the piston to maintain a substantially constant rotational speed of the cooling fan if the hydraulic pressure falls below a predefined threshold.

7. A control system for controlling a hydraulic system having at least an implement pump, a fan-steering-braking (FSB) pump, a fan drive system, a steering system, a braking system, an implement system and one or more accumulators, the control system comprising:

a valve assembly having one or more actuatable valves disposed in selective communication between each of the implement pump, the FSB pump, the fan drive system, the implement system and the accumulators; and a controller operatively coupled to the valve assembly, the controller being configured to actuate one or more valves of the valve assembly such that the FSB pump charges the accumulators and operates at least the fan drive system, the steering system and the braking system if a power source associated with the hydraulic system is operating at less than maximum power, and actuate one or more valves of the valve assembly such that the accumulators operate at least the fan drive system, the steering system and the braking system and such that the FSB pump supplements the implement pump as needed if the power source is operating at maximum power.

8. The control system of claim 7, further comprising at least one sensor operatively coupled to the power source, the sensor being configured to detect at least one parameter indicative of the operational state of the power source and communicate the parameter to the controller.

9. The control system of claim 7, wherein the valve assembly includes at least one combiner valve disposed in communication between the FSB pump and the implement system, the controller may be configured to selectively actuate the combiner valve such that the FSB pump supplements the implement pump as needed if the power source is operating at maximum power.

10. The control system of claim 7, wherein the implement pump is configured to primarily drive the implement system to operate one or more implements, and the FSB pump is configured to primarily drive the fan drive system to operate one or more cooling fans.

11. The control system of claim 7, wherein the controller is configured to place the FSB pump in standby mode if the power source is operating at less than maximum power.

12. The control system of claim 7, wherein the fan drive system includes an over-center motor configured to operate a cooling fan and a variable displacement piston, the controller being configured to further monitor a hydraulic pressure of the fan drive system, and adjust a displacement of the piston to maintain a substantially constant rotational speed of the cooling fan if the hydraulic pressure falls below a predefined threshold.

13. A hydraulic system for a machine, comprising:

an implement pump configured to operate an implement system;

a fan-steering-braking (FSB) pump configured to operate at least a fan drive system, a steering system and a braking system having one or more accumulators associated therewith;

a valve assembly having one or more actuatable valves disposed in communication between each of the implement pump, the FSB pump, the fan drive system, the steering system and the braking system, the implement system and the accumulators; and a controller operatively coupled to the valve assembly, the controller being configured to actuate one or more valves of the valve assembly such that the FSB pump charges the accumulators and operates at least the fan drive system, the steering system and the braking system if a power source associated with the hydraulic system is operating at less than maximum power, and actuate one or more valves of the valve assembly such that the accumulators operate at least the fan drive system, the steering system and the braking system and such that the FSB pump supplements the implement pump as needed if the power source is operating at maximum power.

14. The hydraulic system of claim 13, wherein the implement system is configured to operate one or more implements of the machine, and the fan drive system is configured to operate one or more cooling fans of the machine.

15. The hydraulic system of claim 13, further comprising at least one sensor operatively coupled to the power source, the sensor being configured to detect at least one parameter indicative of the operational state of the power source and communicate the parameter to the controller.

16. The hydraulic system of claim 13, wherein the valve assembly includes at least one combiner valve disposed in communication between the FSB pump and the implement system, the controller may be configured to selectively actuate the combiner valve such that the FSB pump supplements the implement pump as needed if the power source is operating at maximum power.

17. The hydraulic system of claim 13, wherein the fan drive system includes an over-center motor configured to operate a cooling fan and a variable displacement piston, the controller being configured to further monitor a hydraulic pressure of the fan drive system, and adjust a displacement of the piston to maintain a substantially constant rotational speed of the cooling fan if the hydraulic pressure falls below a predefined threshold.

* * * * *